Figure 1:
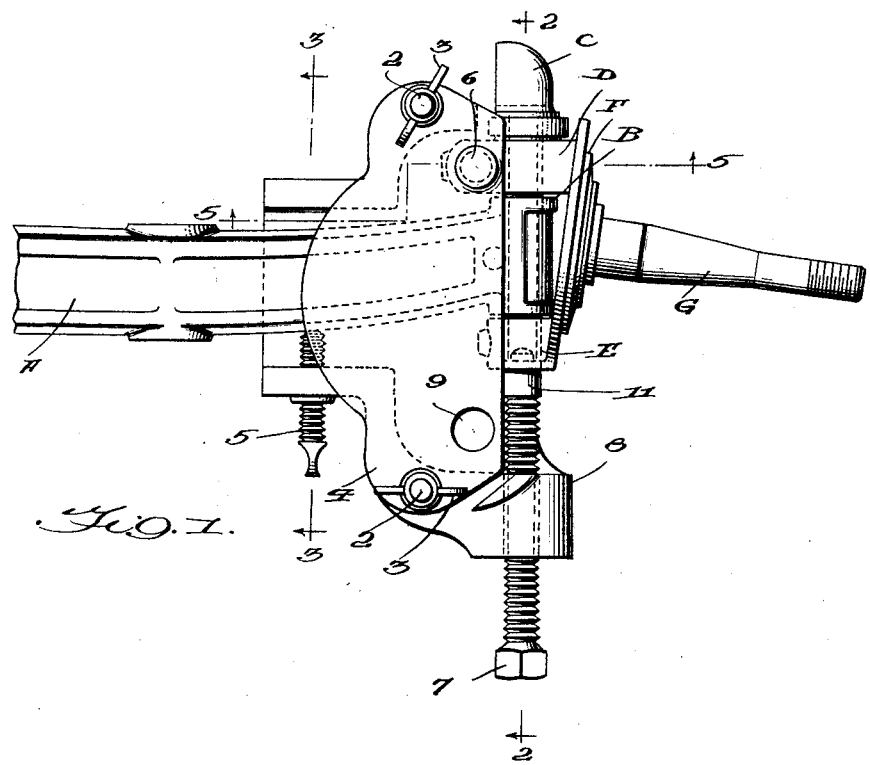

Inventor
Daniel Cannady,
By Richard E. Babcock
Attorney

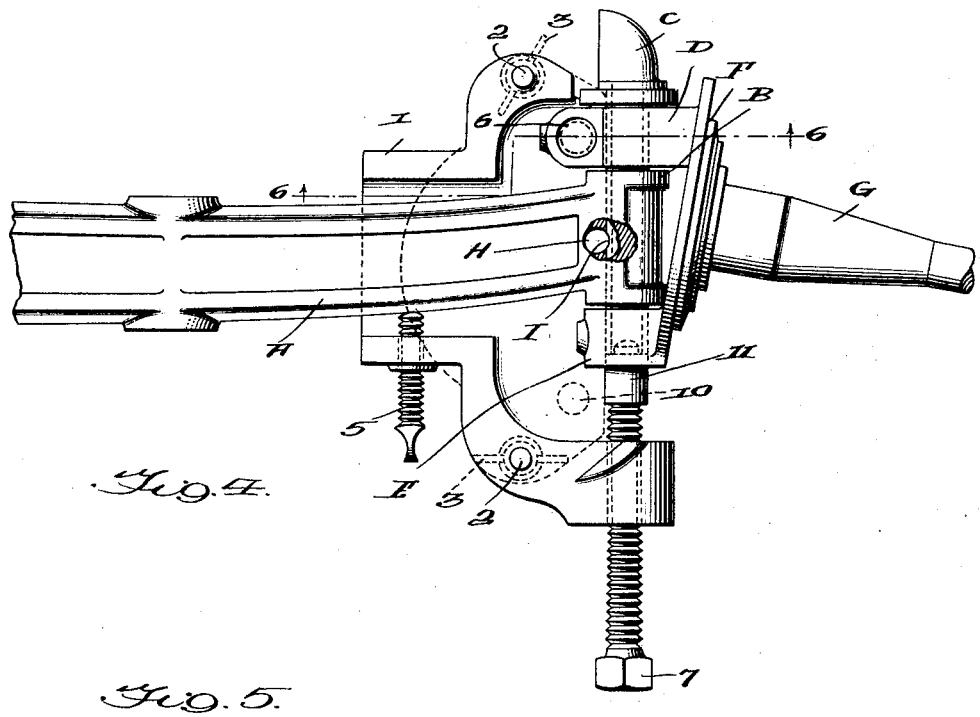
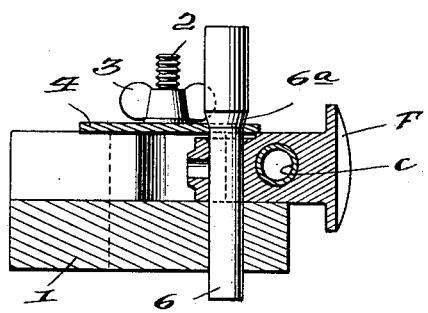
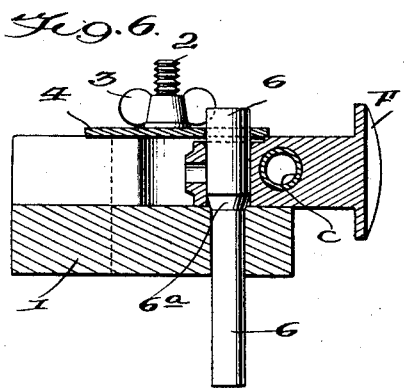
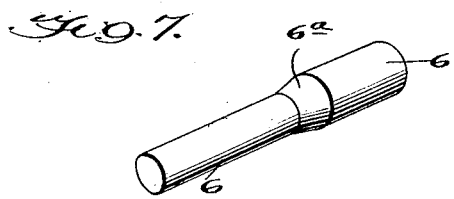

Patented May 9, 1933

1,908,318

UNITED STATES PATENT OFFICE

DANIEL CANNADY, OF EDENTON, NORTH CAROLINA, ASSIGNOR TO HARRY W. KULP AND MARTIN C. DELLINGER, BOTH OF LANCASTER, PENNSYLVANIA

TOOL FOR EXTRACTING KINGPINS

Application filed December 31, 1930. Serial No. 505,925.

This invention relates to a screw type jack king-pin or spindle bolt removers or ejectors and has been designed particularly for use in connection with a popular make of automobile in practically universal use.

In the make of automobile in view the wheel stub axles or spindles are provided with vertically bored lugs which span the end of the axle and a spindle bolt or king-pin passes through the registering lugs of the wheel spindle and the bore in the end of the axle. This king-pin is transversely notched out and a transversely extending pin or bolt in assembled relation extends into the said notch and so holds the king-pin against endwise movement and also against rotary movement. This king-pin is usually tubular and of relatively light weight to cut down the total weight of the machine and for other reasons. Because of the fact that the king-pin is held against endwise movement and rotary movement and yet is subjected to many strains and pressures it frequently becomes very tightly locked in the end of the axle and/or in the lugs of the wheel stub shaft or spindle so that it becomes extremely difficult to remove this king-pin.

Also, of course, the wheel spindle or stub shaft in extending laterally of the axis of the king-pin tends to exert, by its weight, a push on the lower end of the spindle bolt toward the other side of the front axle and to exert a pull on the inner side of the upper portion of the king-pin toward the particular wheel spindle or stub shaft, thus tending to bind the king-pin between them and to cant the king-pin in the end of the front axle, this binding and canting being, of course, very much more pronounced when the weight of the wheel is added to the wheel spindle or the stub axle.

Also in said type of automobile, as well as in several others, the upper and lower faces or edges of the front axle are formed on a gentle curve, so that there is a tendency for anything engaging the upper face of the axle to ride inward down the curved face toward the center of the axle until it strikes some irregularity or until it arrives at the lowest point thereof, and likewise anything engaging the lower face thereof has the tendency to ride outward up the curved face under pressure.

My invention has the foregoing considerations in view, as well as the fact that there are several different sizes of axles to be considered in connection with the make of automobile particularly in mind.

The primary objects of my invention are to provide in a tool for the foregoing purpose, means for positively anchoring the same against movement endwise of the axle under all conditions; to provide means for holding the wheel spindle or stub shaft in definite relation to the king-pin so as to prevent binding of the lugs of said wheel spindle on said king-pin; to provide means for holding the wheel spindle in definite relation to the axle and the tool; to provide adjustable means for adjusting the tool on the axle to maintain the king-pin, the lugs of the wheel spindle, the bore in the end of the front axle, the screw-threaded bore in the arm of the tool and the jack-screw working in said screw-threaded bore in axial alignment so that once locked in position, the parts mentioned will all have a common axial line and thrust of the screw and will be properly centered with relation to the other parts and will serve to force the spindle from position with the least degree of friction and binding.

Further objects are to provide means for clamping the parts in adjusted relation after the desired adjustment has been obtained; to provide in such a device selective means for cooperating with either of a plurality of sizes of bores in one of the lugs of the wheel spindle for holding the parts in fixed relation; and to improve the details of the thrust or jack-screw and to generally simplify and improve the construction of tools of this general character for this general purpose.

The tool of this invention is particularly designed and adapted for use on the axle and wheel of the automobile as assembled and does not require that the axle be removed from the automobile and held by some means on a work bench, but it is sufficient simply to jack up the front wheel of which the spindle bolt or king-pin is to be removed, to disconnect the usual drag or steering link from the upper lug of the wheel spindle, to then apply the tool of the present invention, inserting the anchoring pin in the bore in the end portion of said upper lug next adjacent the parts so that when the adjusting screw is in engagement with the lower face of the axle the jack or thrust-screw and king-pin are in proper axial alignment, then turning the wing nuts up tight to clamp the parts in this adjusted position and finally turning the jack or thrust-screw so as to eject the spindle bolt or king-pin, it being understood, of course, that the anchoring bolt for the spindle bolt or king-pin has been previously removed.

Of course, the tool embodying my invention is capable of other uses in the automobile field and other fields, but its primary use is for the particular field stated.

In this invention I show and describe only the preferred embodiment of my invention simply by way of illustration of the practice of my invention as by law required. However, I am well aware that my invention is capable of other embodiments and that the different details thereof may be modified in various ways all without departing from my said invention; therefore, the drawings and description herein are to be considered as merely illustrative and not as exclusive.

Figure 2:
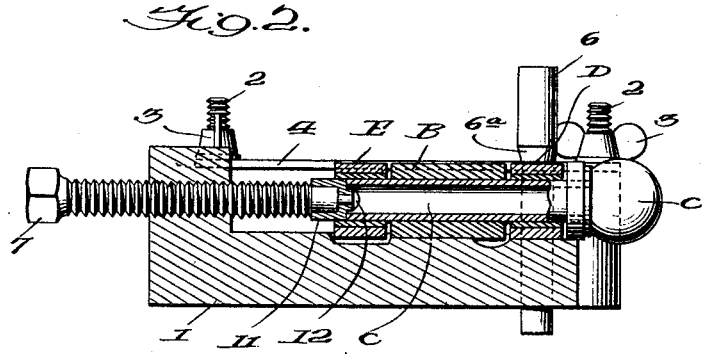
Figure 3:
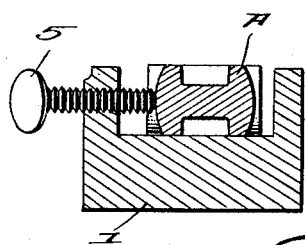

In the accompanying drawings:

Figure 1 represents a front elevation of my invention as applied in use;

Figure 2, a sectional view on the line 2—2 of Figure 1, looking in the direction of the arrows;

Figure 3, a sectional view on the line 3—3 of Figure 1, looking in the direction of the arrows;

Figure 4, a view similar to Figure 1, showing the tool as applied to a larger size axle and the clamping plate being reversed in position and indicated in dotted lines in order to permit the anchoring pin to move to fit the bore in the corresponding upper lug of the wheel spindle.

Figure 5, a sectional view on the line 5—5 of Figure 1, looking in the direction of the arrows;

Figure 6, a sectional view on the line 6—6 of Figure 4, looking in the direction of the arrows;

Figure 7, a perspective detail view of the anchoring pin.

Referring now in detail to the drawings, A designates the front axle; B, the vertically bored extreme end portion or end boss of the front axle; C, the spindle bolt or king-pin; D, the upper lug of the wheel spindle F; E, the lower lug of the wheel spindle F; F, the wheel spindle comprising said lugs and the stub axle G; H, a transverse bore extending through the end portion of the axle A and intersecting the king-pin C, which is notched out as at I to receive with said bore H, and to be engaged and locked in position by, a transverse bolt or pin, not shown, disposed in the bore H.

All the foregoing parts are old and well known and are merely thus briefly referred to and illustrated to make the construction, operation and function of my invention easily understood, but more detailed consideration of said parts is not believed to be necessary or desirable.

My invention comprises a body 1, to be applied to the end portion of the shaft A and to be held or clamped thereon by means of the screw threaded stud bolts or lugs 2, integral with or rigid with the body 1 and receiving wing nuts 3, a clamping plate 4 extending over the face of the body 1, from and between the bolts 2, having been first interposed between the body 1 and the nuts 3. This body 1 is deeply pocketed or recessed to receive the axle A, the end boss B thereof, and the upper and lower lugs D and E of the wheel spindle, the inner face of the recessed portion of the body 1 being further notched out or recessed as may be necessary, as illustrated, for instance, in Figure 2, to accommodate the parts and make a flat engagement throughout the length of the axle portion extending within the tool. The depth of the recess or recessed portion or portions of the body 1 will be so calculated and so related to the axle A that when the parts are assembled on the axle the axle will extend very slightly beyond the edge of the body so that when the clamping plate 4 is applied and the nuts 3 turned up the clamping plate will engage the axle A before it engages the body 1 and hence will act to clamp the axle A and the body 1 in the respective adjusted position in which the parts may be set.

The upper part of the recessed portion of the body 1 adjacent the outer end edge thereof is formed with a bore with which is to be aligned the transverse bore in the the inner end portion of the lug D, and as thus aligned the anchoring pin 6 will pass through or extend through said lug D and the bore in the body 1, as illustrated, for instance, in Figure 5. The parts will then be moved, or the body 1 will be swung about the pin 6 until the spindle bolt or king-pin C in the bores of the lugs D and E and of the intervening boss B, is in axial alignment with the thrust or jack-screw 7, working through the screw-threaded bore in the lower extension or end lug or shoulder 8 preferably integral with the body 1. When these parts have been thus aligned as stated the set screw 5 working through the rear portion of the body 1 and disposed parallel to the thrust or jack screw 7 will be turned up until its inner end engages the axle A to act as a stop to prevent misalignment of the mentioned parts when power is applied to the thrust screw. The stop screw 5 will preferably have a broad, dull end to act as a stop and to avoid cutting or biting into the axle A. As thus adjusted, the wing nuts 3 will be turned up on the bolts or stubs 2 to force the plate 4 tightly against the axle A and associated parts to firmly clamp the tool and axle together in adjusted relation and to take the strain off of the anchoring pin 6 to some degree, at least.

To provide for the proper centering of two different sizes of axles and assemblies, which involve two different sizes of bores in the inner ends of the corresponding wheel spindle lugs D, I form the clamping plate 4 so as to be reversible and so as to accommodate by a small hole 10, the smallest cylindrical portion of the anchoring pin 6 and with a larger hole 9 to accommodate the larger upper cylindrical portion of the pin 6, said portions of the pin 6 being separated from each other by a preferably beveled or tapering shoulder 6a.

Assuming that the tool is to be used on the small size or commercial passenger car axle assembly, the plate 4 is applied to the body 1 with the small hole 10 in registry with the cooperating bore in the body 1 and the adjusting screw 5, turned inward to engage the bottom of the small size axle A. As thus assembled and used with the small size passenger car axle, the lug D will be interposed between the clamping plate 4 and the body 1 with its transverse bore in registry with the hole 10 of the plate 4 and the cooperating bore of the body 1 and the bores in said plate 1 and in said lug D will preferably be of the same diameter to receive the smaller cylindrical portion of the pin 6, the shoulder 6a of which will engage with the outer face of the clamping plate 4, thus insuring the proper center of the pin 6 in the body 1 and the proper centering of the lug D between the body 1 and plate 4, after which the stop screw 5 is to be turned up until, when the king-pin C and thrust or jack screw 7 are in axial alignment, the end of the stop screw 5 engages the bottom of the axle A.

When the larger size commercial or truck axle A and associated parts are to be operated upon, as indicated in Figure 4, the plate 4 is reversed end for end so that its large opening 9, illustrated in Figure 1, is brought into registry with the transverse bore in the body 1 with the lug D interposed between the plate 4 and body 1, and with the larger bore in this lug D aligned with the large hole 9 and concentric with the axis of the bore in the body 1, when the anchoring pin 6 will be inserted, with its small end first, through the plate 4, the bore of the lug D and the body 1, until the shoulder 6a engages the end edge wall of the bore in body 1, preventing further inward movement of the pin 6, at which time the enlarged cylindrical portion of the pin 6 will be disposed in both the lug D and the hole 9 of plate 4, making a tight fit in the bore in the body 1, all as well illustrated in Figure 6, so that the parts will be held in proper centered position and lost motion will be prevented.

In this case also, after the parts have been adjusted so that the spindle bolt or king pin C and the thrust or jack screw 7 are in axial alignment and the stop screw 5 is in engagement with the bottom of the axle A, the wing nuts 3 will be turned up to firmly clamp the parts on the axle A in such position.

The thrust screw of jack-screw 7 will preferably have an independently turnable or rotatable end cap 11 for engaging and exerting thrust upon the end of the spindle bolt of king-pin C, and may have its upper end upset and spread over the bolt as at 12 to act as a rivet or fastening to maintain the thrust cap 11 in position on the end of the screw.

While this detailed construction of the screw 7 is preferred, any one of a number of constructions permitting relative movement between the screw 7 and a thrust end or cap functioning the same as thrust cap 11 may be substituted, or removably thrust rings may be applied over the end of the thrust screw, or just an ordinary screw without any special end construction may be used.

Having thus described my invention, what I claim as new and desire to seek by Letters Patent is:

1. A device for removing king pins from their cooperating axles and wheel spindles, said device comprising a body, a clamping plate and means for clamping said body and plate against the intervening end portion of an axle, said clamping plate and said body being formed with concentric perforations adapted to register with the reach rod bore in an intervening portion of a wheel spindle, in combination with a thrust-screw screw-threaded in said body and adapted to be axially aligned with said king pin, an anchoring pin extending through the registering bores in said body and clamping plate and the intervening wheel spindle and making a snug fit to permit said body and plate to swing about the axis of said anchoring pin as a pivot until the thrust-screw has been moved into axial alignment with the king pin, and an adjusting screw turnable through said body and normally adjusted to engage the opposed face of the axle when the thrust screw and the king bolt are in axial alignment to prevent movement between the body and the axle under the influence of the thrust of the thrust screw to disturb the axial alignment.

2. A device for removing king pins from their cooperating axles and wheel spindles, said device comprising a body, a clamping plate and means for clamping said body and plate against the intervening end portion of an axle, said clamping plate and said body being formed with concentric perforations adapted to register with the reach rod bore in an intervening portion of a wheel spindle, in combination with a thrust-screw screw-threaded in said body and adapted to be axially aligned with said king pin, an anchoring pin extending through the registering bores in said body and clamping plate and the intervening wheel spindle and making a snug fit therein.

3. A device for removing king pins from their cooperating axles and wheel spindles, said device comprising a rigid body, recessed to receive the end portion of an axle, said body being formed with a perforation adapted to register with the reach rod bore in a wheel spindle, in combination with a thrust-screw screw-threaded in said body and adapted to be axially aligned with said king pin, and an anchoring pin extending through the registering bores in said body and wheel spindle.

4. A device for removing king pins from their cooperating axles and wheel spindles, said device comprising a body, a clamping plate and means for clamping said body and plate against the intervening end portion of an axle, in combination with a thrust-screw screw-threaded in said body and adapted to be axially aligned with said king pin, and means for preventing movement of the device as a whole endwise of the axle to which it may be applied.

5. A device for removing king pins from their cooperating axles and wheel spindles, said device comprising a body, a clamping plate and means for clamping said body and plate against the intervening end portion of an axle, in combination with a thrust-screw screw-threaded in said body and adapted to be axially aligned with said king pin, and means cooperating with said body and clamping plate to substantially prevent relative movement between the axle and the wheel spindle and to prevent movement of said body in a direction endwise of the axle to which it is applied.

6. A device for removing king pins from their cooperating axles and wheel spindles, said device comprising a body recessed to receive the intervening end of an axle, in combination with a thrust-screw screw-threaded in said body and adapted to be axially aligned with said king pin, and means cooperating with said body to substantially prevent relative movement between the axle and the wheel spindle and to prevent movement of said body in a direction endwise of the axle to which it is applied.

In testimony whereof, I have signed my name to this specification at Edenton, North Carolina this 29 day of December 1930.

DANIEL CANNADY.